(12) United States Patent
McMeekin et al.

(10) Patent No.: US 10,149,263 B2
(45) Date of Patent: Dec. 4, 2018

(54) TECHNIQUES FOR TRANSMITTING/RECEIVING PORTIONS OF RECEIVED SIGNAL TO IDENTIFY PREAMBLE PORTION AND TO DETERMINE SIGNAL-DISTORTING CHARACTERISTICS

(71) Applicant: FreeWave Technologies, Inc., Boulder, CO (US)

(72) Inventors: Steven E. McMeekin, Evergreen, CO (US); Timothy G. Mester, Longmont, CO (US)

(73) Assignee: FreeWave Technologies, Inc., Boulder, CO (US)

( * ) Notice: Subject to any disclaimer, the term of this patent is extended or adjusted under 35 U.S.C. 154(b) by 0 days.

(21) Appl. No.: 14/924,372

(22) Filed: Oct. 27, 2015

(65) Prior Publication Data

US 2016/0128010 A1    May 5, 2016

Related U.S. Application Data

(60) Provisional application No. 62/072,253, filed on Oct. 29, 2014.

(51) Int. Cl.
*H04W 4/00* (2018.01)
*H04W 56/00* (2009.01)

(52) U.S. Cl.
CPC ..... *H04W 56/005* (2013.01); *H04W 56/0055* (2013.01)

(58) Field of Classification Search
CPC ........... H04W 56/005; H04W 56/0055; H04W 52/0206; H04W 52/241; H04B 17/18
See application file for complete search history.

(56) References Cited

U.S. PATENT DOCUMENTS

| | | | |
|---|---|---|---|
| 5,488,632 A | 1/1996 | Mason et al. | |
| 6,819,133 B1 * | 11/2004 | Kliesner | G11C 7/24 326/38 |
| 7,359,311 B1 | 4/2008 | Paranjpe et al. | |

(Continued)

OTHER PUBLICATIONS

Final Office Action from U.S. Appl. No. 14/924,309, dated Oct. 6, 2017, 25 pages.

*Primary Examiner* — Asad M Nawaz
*Assistant Examiner* — Syed Ali

(57) ABSTRACT

A method for operating a receiver in a wireless communication system to synchronize the receiver to a received signal. The received signal is preamble correlated to identify a preamble portion of the signal. Portions of the received signal near the identified preamble portion are processed to determine signal-distorting channel characteristics, such as multipath channel delay spread, of the channel over which the received signal propagated. A digital filter is configured based on the determined channel characteristics to compensate for the signal-distorting channel characteristics, and the received signal is filtered with the configured digital filter. The filtered received signal is second preamble correlated with a second preamble that is different than the first preamble to produce a second preamble correlation. The second preamble correlation is processed to identify delay in the filtered received signal. Portions of the filtered received signal are identified and processed based on the identified delay.

14 Claims, 9 Drawing Sheets

(56) References Cited

U.S. PATENT DOCUMENTS

| | | |
|---|---|---|
| 7,746,896 B2 | 6/2010 | Venkatachalam |
| 8,509,711 B1 | 8/2013 | Bagley et al. |
| 8,787,873 B1 | 7/2014 | Hitt et al. |
| 9,117,457 B2 | 8/2015 | Kwan et al. |
| 9,584,170 B2 | 2/2017 | Mester et al. |
| 9,628,141 B2 | 4/2017 | Wyss et al. |
| 9,787,354 B2 | 10/2017 | McMeekin et al. |
| 9,819,446 B2 | 11/2017 | McMeekin et al. |
| 2002/0146994 A1 | 10/2002 | Marrah et al. |
| 2003/0176161 A1 | 9/2003 | Dale et al. |
| 2003/0210663 A1 | 11/2003 | Everson et al. |
| 2005/0013395 A1* | 1/2005 | Kliesner ............... G06F 5/06 375/372 |
| 2005/0013396 A1* | 1/2005 | Kliesner ............ H03L 7/0814 375/372 |
| 2005/0249308 A1* | 11/2005 | Mester ............... H04L 1/0054 375/281 |
| 2005/0250457 A1* | 11/2005 | Mester ............... H04B 17/309 455/101 |
| 2006/0074558 A1 | 4/2006 | Williamson et al. |
| 2006/0171335 A1 | 8/2006 | Yuen et al. |
| 2006/0256884 A1 | 11/2006 | Tomioka et al. |
| 2008/0089443 A1 | 4/2008 | Sanada et al. |
| 2008/0107079 A1 | 5/2008 | Bae et al. |
| 2009/0040937 A1 | 2/2009 | Xhafa et al. |
| 2009/0225741 A1* | 9/2009 | Wang ............... H04L 27/2613 370/345 |
| 2009/0253387 A1 | 10/2009 | van Rensburg et al. |
| 2009/0258665 A1 | 10/2009 | Bourlas et al. |
| 2009/0274112 A1* | 11/2009 | Ma ..................... H04L 1/06 370/330 |
| 2009/0298522 A1 | 12/2009 | Chaudhri et al. |
| 2009/0303918 A1* | 12/2009 | Ma ................... H04B 7/2606 370/315 |
| 2010/0226491 A1 | 9/2010 | Conte et al. |
| 2010/0311452 A1 | 12/2010 | Li et al. |
| 2011/0122831 A1 | 5/2011 | Kim et al. |
| 2012/0014349 A1* | 1/2012 | Chung ............... H04B 7/0684 370/329 |
| 2012/0184284 A1 | 7/2012 | Moisio et al. |
| 2012/0230453 A1* | 9/2012 | Shih ................. H04L 25/0212 375/343 |
| 2013/0003674 A1 | 1/2013 | Lin et al. |
| 2013/0051293 A1 | 2/2013 | Wentink et al. |
| 2013/0077660 A1* | 3/2013 | Ko .................... H04B 7/0639 375/219 |
| 2013/0102305 A1 | 4/2013 | Liu et al. |
| 2013/0215219 A1 | 8/2013 | Hefeeda et al. |
| 2013/0265915 A1 | 10/2013 | Choi et al. |
| 2014/0119216 A1 | 5/2014 | Patel et al. |
| 2014/0153625 A1 | 6/2014 | Vojcic et al. |
| 2014/0221028 A1 | 8/2014 | Desai et al. |
| 2014/0247800 A1 | 9/2014 | Ro et al. |
| 2014/0254639 A1 | 9/2014 | Tahir et al. |
| 2014/0341133 A1 | 11/2014 | Wang |
| 2015/0092761 A1 | 4/2015 | Kim et al. |
| 2015/0117227 A1* | 4/2015 | Zhang ............... H04L 1/0057 370/245 |
| 2015/0124688 A1 | 5/2015 | Xu et al. |
| 2015/0133185 A1 | 5/2015 | Chen et al. |
| 2015/0263816 A1 | 9/2015 | Hinman et al. |
| 2015/0334575 A1 | 11/2015 | Joshi et al. |
| 2015/0381291 A1 | 12/2015 | Mahajan et al. |
| 2016/0126988 A1 | 5/2016 | Mester et al. |
| 2016/0127009 A1 | 5/2016 | McMeekin et al. |
| 2016/0127110 A1 | 5/2016 | McMeekin et al. |
| 2016/0127953 A1 | 5/2016 | McMeekin et al. |
| 2016/0156750 A1* | 6/2016 | Zhang ................. H04L 69/22 370/338 |

* cited by examiner

TECHNIQUES FOR TRANSMITTING/RECEIVING PORTIONS OF RECEIVED SIGNAL TO IDENTIFY PREAMBLE PORTION AND TO DETERMINE SIGNAL-DISTORTING CHARACTERISTICS

CROSS REFERENCE TO RELATED APPLICATION

This application claims the benefit of U.S. Provisional Application Ser. No. 62/072,253 filed on Oct. 29, 2014 and entitled Single Carrier Frequency Domain Equalizer Time Synchronization In A Broadband Transceiver, which is incorporated herein by reference in its entirety and for all purposes.

BACKGROUND

In wireless communication systems, it is common for receivers to perform a correlation on the preamble of a received signal, and to use the output of that correlation to synchronize the receiver to the received signal (i.e., to identify the beginning of the data portion of the signal). In these communication systems the received signal may have propagated along several different paths (i.e., a multipath channel) after being transmitted by a transmitter. The multipath channel can induce distortion into the signal (e.g., multipath delay spread). These channel-induced distortions introduce uncertainty and therefore errors into the synchronization provided by the preamble correlation. There remains a continuing need for improved methods for synchronizing receivers in wireless communication systems.

SUMMARY

Embodiments of the invention include a method for operating a receiver in a wireless communication system to synchronize the receiver to a received signal. In embodiments, the received signal is preamble correlated to identify a preamble portion of the signal. Portions of the received signal, optionally portions near the identified preamble portion, are processed to determine signal-distorting channel characteristics, optionally multipath channel delay spread, of the channel over which the received signal propagated. A digital filter is configured based on the determined channel characteristics to compensate for the signal-distorting channel characteristics. The received signal is filtered with the configured digital filter. The filtered received signal is second preamble correlated to produce a second preamble correlation. The second preamble correlation is processed to identify delay in the filtered received signal. Portions of the filtered received signal are identified and processed based on the identified delay.

DESCRIPTION OF THE INVENTION

Figure 1:
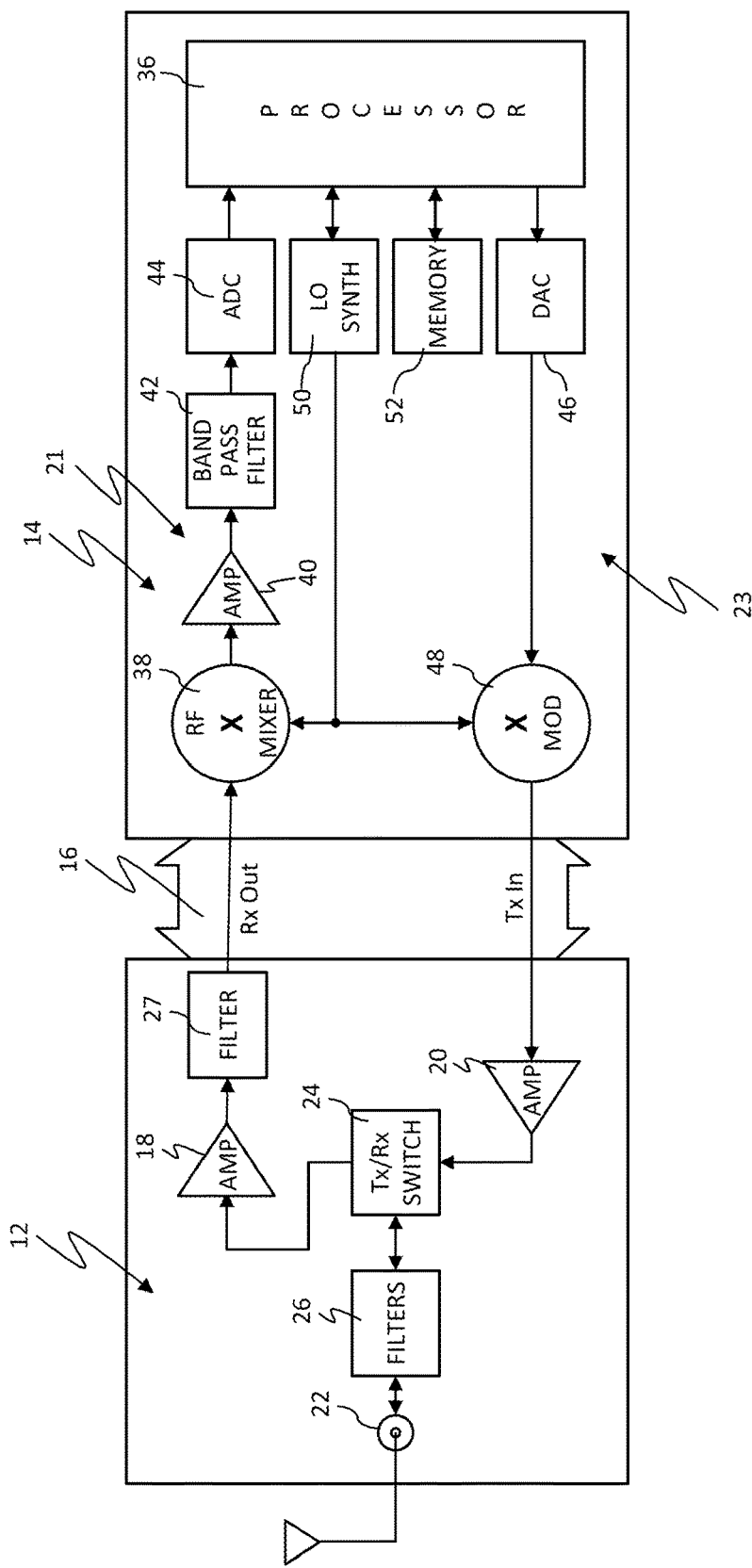
FIG. 1 is a diagrammatic illustration of a transceiver in accordance with embodiments of the invention.

FIG. 1 is a diagrammatic illustration of a broad band transceiver 10 that can include receive signal time synchronization in accordance with embodiments of the invention. As shown, transceiver 10 includes a radio frequency (RF) front end (RFFE) 12 coupled to modem module (MM) 14 by a connector 16. One embodiment of transceiver 10 is configured as a time division multiple access (TDMA) radio that operates at one of over a wide range of carrier frequencies such as 100 MHz-6 GHz, and channel bandwidths such as 6.25 KHz-10 MHz. Other embodiments of the invention operate at other frequency bands, other channel bandwidths and/or at multiple carrier frequencies, and can be configured with other physical layers and hardware structures. One or more suitable modulation schemes such as, for example, FSK (frequency shift keying) QPSK (quadrature phase shift keying), 16 QAM (quadrature amplitude modulation) and 64 QAM, and multicarrier schemes such OFDM (orthogonal frequency division multiplexing) and OFDMA (orthogonal frequency division multiple access) can be used. In embodiments, the transceiver 10 can dynamically select modulation schemes based on factors such as desired data transmission rates, available channel bandwidth and interference levels. Applications of transceivers 10 include, for example, oil and gas field management, water and wastewater management, location tracking and machine-to-machine (M2M) applications. Other embodiments of the invention are configured with other channel access methods such as code division multiple access (CDMA) and frequency division multiple access (FDMA).

The RFFE 12 of the illustrated embodiment is configured for operation at specific carrier frequency bands, and the MM 14 is configured for wide band operation with any of the carrier frequency-specific RFFEs. Accordingly, the RFFE 12 includes band-specific receive (Rx) and transmit (Tx) low noise amplifier 18 and power amplifier 20, respectively, coupled to an antenna terminal 22 through a receive/transmit (Rx/Tx) switch 24. RFFE 12 can also include band-specific filters such as those shown at 26 and 27. Although only the receiver output from (Rx Out) and transmitter input to (Tx In) the RFFE 12 are expressly shown, other signal connections to the RFFE (e.g., a control signal to the receive/transmit switch 24) are coupled between the RFFE and MM 14 by the connector 16.

MM 14 includes a receiver section 21, a transmitter section 23, and processor 36. The receiver section 21 is a superheterodyne receiver and includes an RF mixer 38, intermediate frequency (IF) amplifier 40, band pass filter 42 and analog-to-digital converter (ADC) 44. Transmitter section 23 includes digital-to-analog converter (DAC) 46 and IQ modulator 48. The RF mixer 38 and modulator 48 are driven by a local oscillator (LO) synthesizer 50 that is coupled to the processor 36 in the illustrated embodiment. Processor 36, which is a digital signal processor (DSP) in embodiments, is coupled to memory 52. Data defining control and signal processing programs and algorithms used by the processor 36, as well as data or other information generated or used by the processor, can be stored in memory 52. RF mixer 38 shifts the carrier frequency of the received RF signal to an intermediate frequency. The received RF signal at the intermediate frequency is then modified or processed by the IF stage including amplifier 40 and band pass filter 42 before applied to the ADC 44. In one embodiment of the invention the intermediate frequency is nominally 140 MHz, and the received RF signals are band pass filtered by a band pass filter 42 having a pass band of about 10 MHz. Other intermediate frequencies and pass bands are used in other embodiments. Processor 36 performs other receive signal processing, transmit signal processing and control functions. For example, the processor 36 performs an IF mixer function to shift the digital received signal from the intermediate frequency to the channel base band, and demodulates those signals. Base band transmit signals produced by the processor 36 are converted to analog form by DAC 46 and modulated onto the carrier by IQ modulator 44. The modulated transmit signals are then outputted to the RFFE 12 for transmission.

Figure 2:
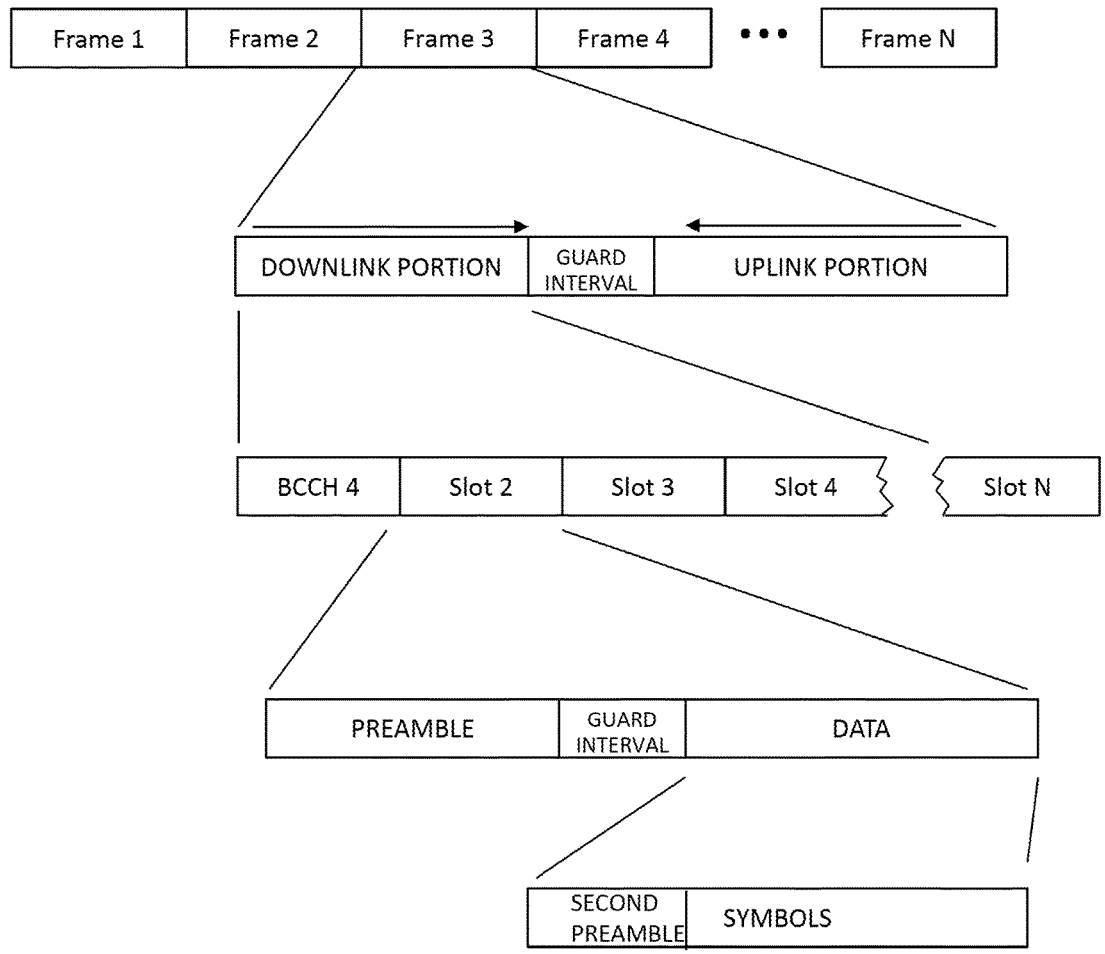
FIG. 2 is a diagrammatic illustration of an exemplary communication frame structure that can be used by the transceiver shown in FIG. 1.

As illustrated in FIG. 2, when configured for TDMA channel access the wireless communications between transceivers 10 utilize an airlink protocol organized into sequential frames. Each frame includes a time division duplexed (TDD) downlink portion and an uplink portion that are separated in time by a guard interval. One (e.g., a first) transceiver 10 transmits data during the downlink portions of the frames, and another (e.g., a second) transceiver communicating with the first transceiver by the communication frames transmits data intended for that first transceiver during the uplink portions of the frames. Both the downlink and uplink frame portions include a plurality of subframes or slots that are predetermined or assigned to contain specific types of information. For example, one of the slots of the downlink frame portion transmitted by a transceiver 10 is known as the broadcast control channel (BCCH), and includes information used by the transceiver to control parameters such as transmission times, slot times and lengths, frequency and/or modulation method of the associated and responsive uplink frame portion. Also by way of example, a slot in an uplink frame portion transmitted by a transceiver 10 is known as the random access channel (RACH), and can include data from, for example, a sensor coupled to that transceiver.

The uplink portions and downlink portions of the frames include one or more data portions preceded by one or more preambles. For example, individual slots of the frames may include one or more data portions preceded by one or more preambles. FIG. 2 illustrates an example of a slot that includes a first preamble and data portion separated by a guard interval. Data in the data portions of the frames represents a series of symbols. As described in greater detail below, receive signal time synchronization in accordance with the invention makes use of a second or synchronization preamble located in the downlink and/or uplink portions. In the embodiment illustrated in FIG. 2, the second preamble is located in the data portions of slots, for example at a location preceding the symbols. Other embodiments of the invention include other airlink protocol frame structures. In particular, embodiments of the invention can include one or more second preambles, and each second preamble can be at other locations in the frames. The preambles are predetermined sequences of data (e.g., stored in memory 52), and can be of any suitable length. In some embodiments of the invention, the second preambles are shorter in length than the first preambles.

Figure 3:
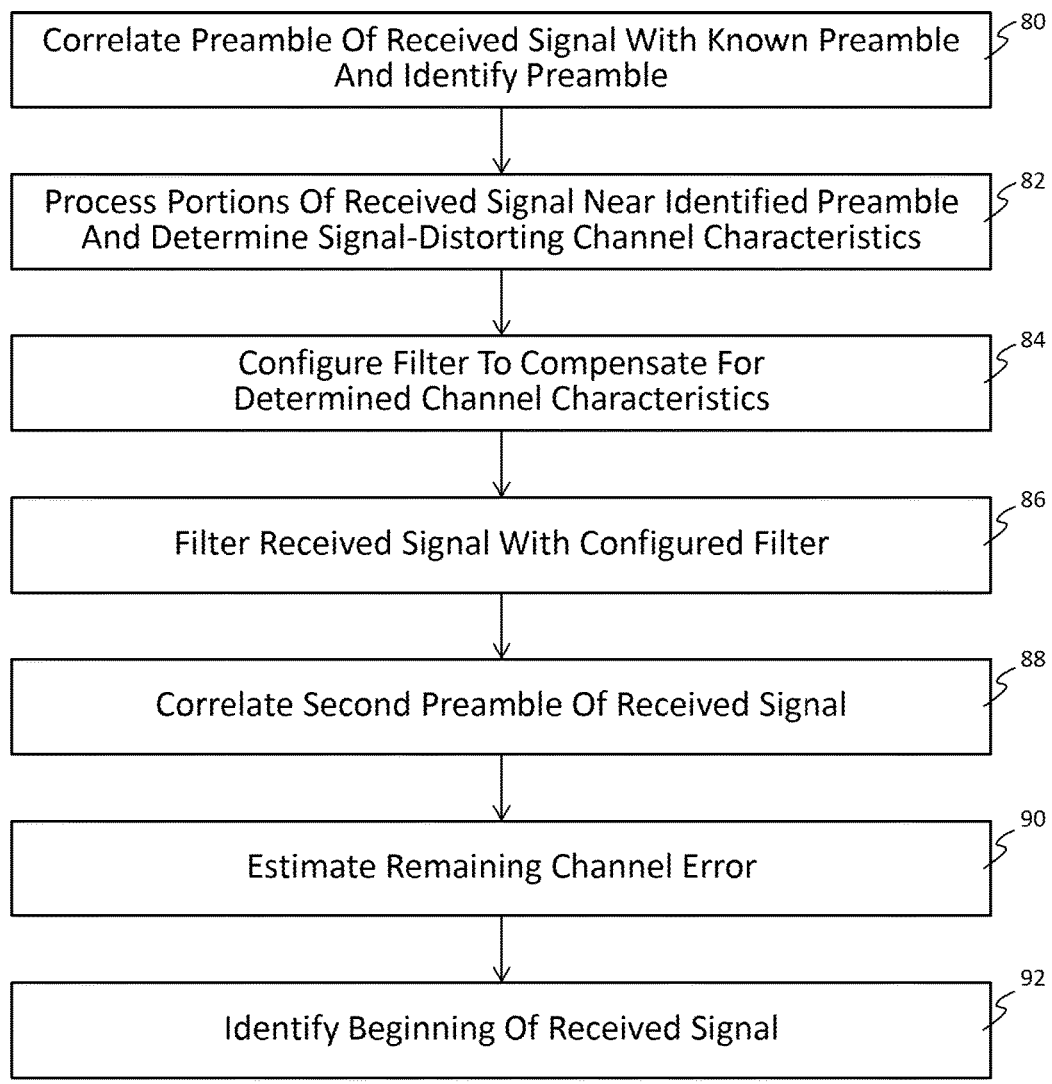
FIGS. 3-9 are exemplary illustrations of signals received by and produced by the transceiver shown in FIG. 1.
Figure 4:
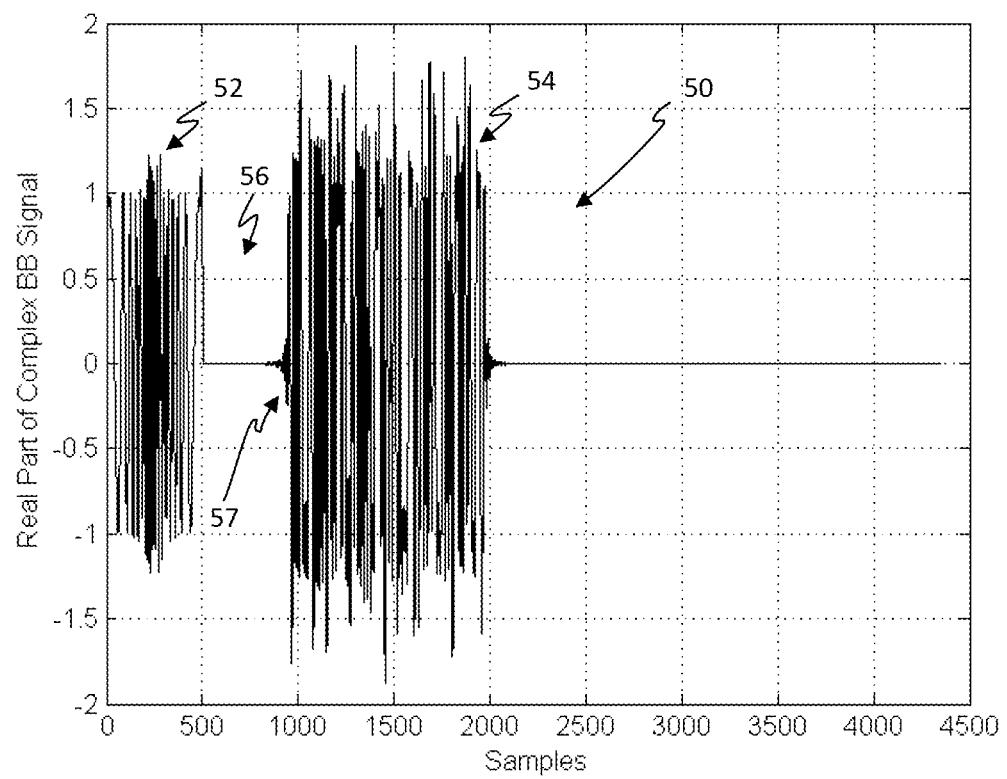

A method in accordance with embodiments of the invention by which processor 36 operates to time synchronize received signals (e.g., to identify samples of the received signals that correspond to the beginning of the data portions of the communications frames) can be described with reference to FIG. 3. For purposes of example, the method is described with reference to the exemplary airlink protocol slot portion of a transmitted signal shown in FIG. 4. As shown in FIG. 4, the transmitted slot portion 50 of the signal includes a first preamble 52 followed by a data portion 54. A guard interval 56 during which no data or other information is transmitted separates the first preamble 52 and data portion 54. A second or synchronization preamble 57 precedes the data portion 54. In embodiments, the second preamble is shorter in length than the first preamble 52.

Figure 5:
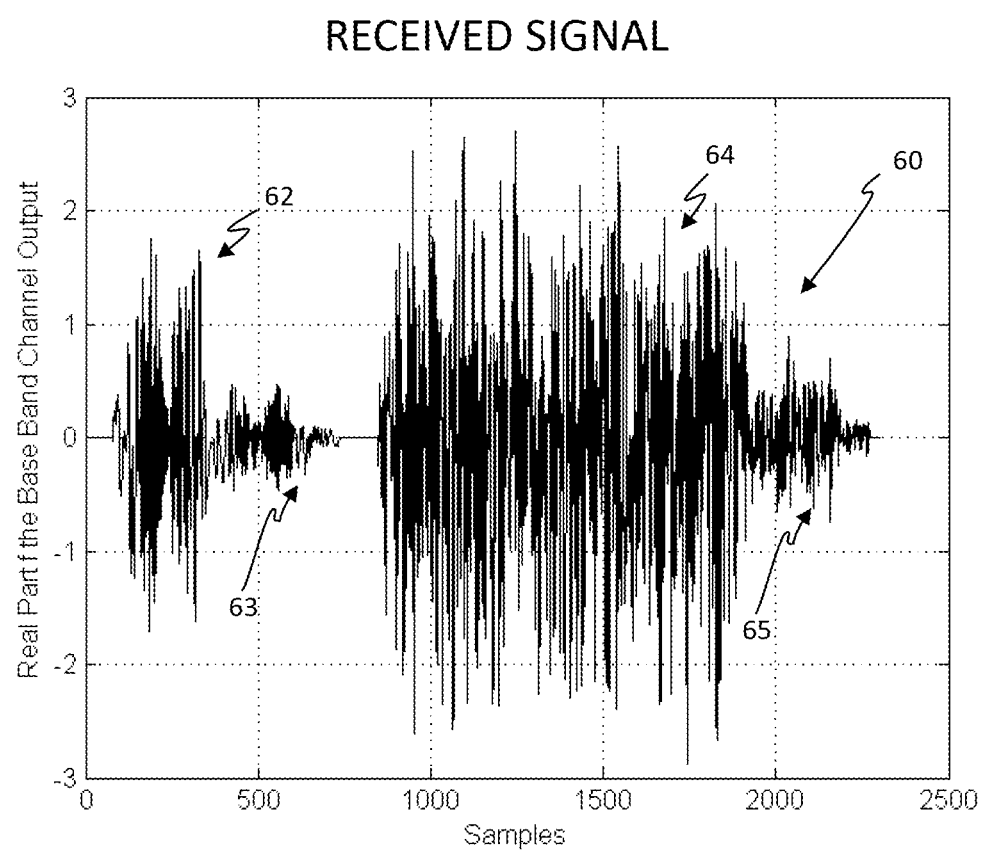
Figure 6:
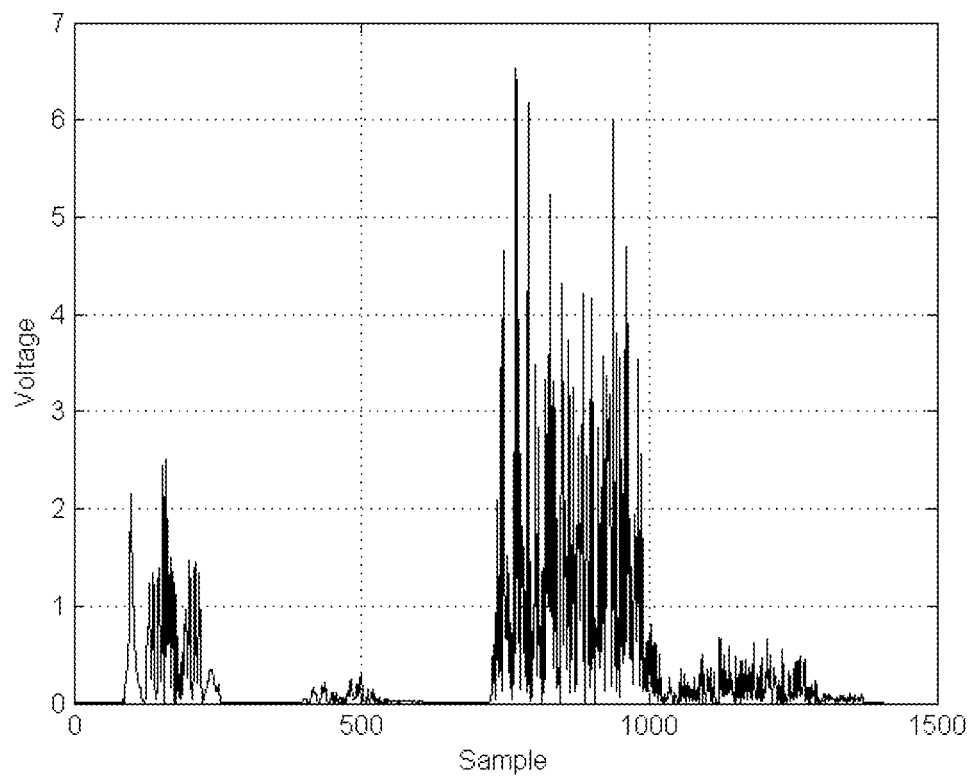

Transceivers 10 in accordance with the invention are configured to generate transmit signals having airlink protocols such as those described above. After the slot portion 50 of the signal shown in FIG. 4 is transmitted, it is propagated through a channel that may distort the signal. FIG. 5 is an example of a received slot portion 60 of the signal shown in FIG. 4 when it is received at a transceiver 10. As is illustrated in FIG. 5, the signal has been delayed and the preamble 62 and data portion 64 are spread out in time. The received slot portion 60 also has "echo" components 63 and 65 that may have some characteristics similar to the preamble 62 and data portion 64, respectively, but that propagated about a different and longer path than the other portions of the preamble and data portion. The signal shown in FIG. 5 therefore illustrates multipath channel delay spread. If the received slot portion 60 were envelope detected by the processor 36, the output may resemble that shown in FIG. 6. As is evident from FIG. 6, the data envelope is larger than the first preamble. These and other propagation channel-induced distortions in the received signal can inhibit the ability of the processor 36 to accurately identify the beginning of the data portions of the signal.

Figure 7:
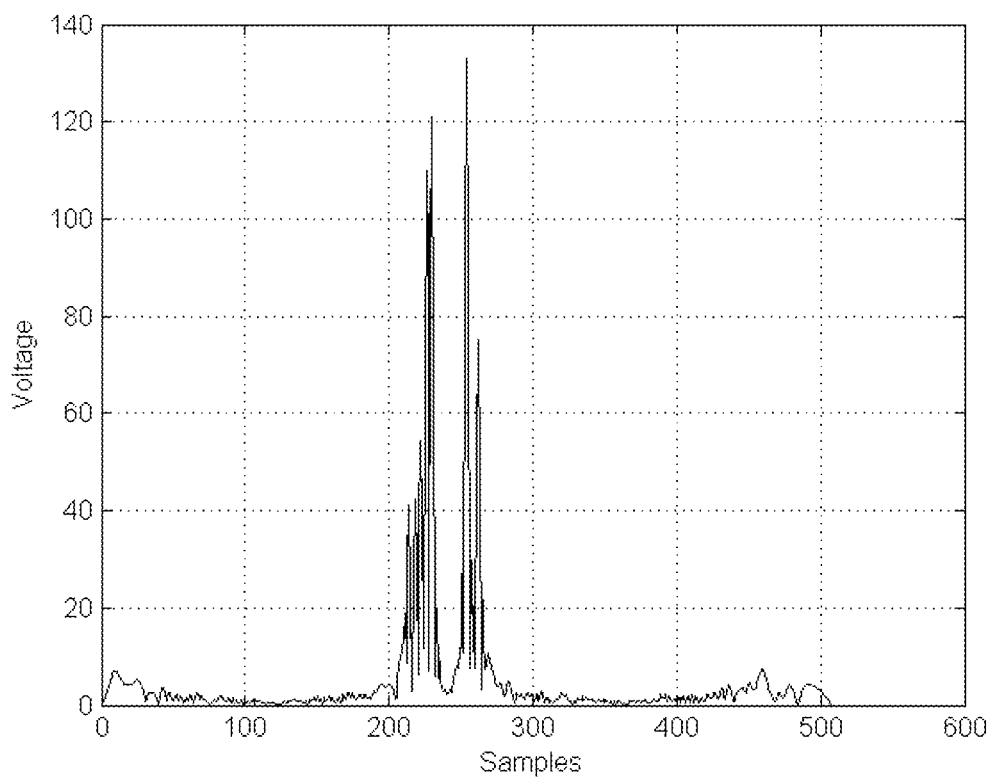

Referring again to FIG. 3, at preamble correlation step 80 the received signal is correlated against an expected first preamble. FIG. 7 is an exemplary illustration of an output signal produced by preamble correlation step 80 when the received signal 60 shown in FIG. 5 is correlated with the first preamble of that received signal. As is evident from FIG. 7, the peak output value is not consistent in time (i.e., there are several peaks dispersed in time). The preamble correlation output can be used to provide a coarse time synchronization, but exhibits a range of error that may inhibit its use as an accurate index that points to the beginning of the data portion of the signal.

The preamble correlation step 80 output does provide sufficient information to enable the identification generally of portions of the received signal 60 that include portions such as the first preamble and/or data portion. Accordingly, at step 82 a portion of the signal near the identified first preamble (i.e., a channel sample portion) is processed to determine the signal-distorting characteristics of the channel over which the signal propagated before it was received at the transceiver 10 (i.e., a channel transfer function). In embodiments, step 82 is performed on a portion of the received signal 60 that begins before the first preamble and extends beyond the first preamble. Other embodiments of the invention use other methods to determine the channel transfer function. Using the identified signal-distorting characteristics, processor 36 can configure a digital filter or equalizer (e.g., within the processor 36 or alternatively a separate component) to compensate for and mitigate those characteristics (e.g., by configuring a filter that has an inverse of the channel transfer function) as shown at step 84. Known or otherwise conventional approaches can be used for the channel configuration step 84.

Figure 8:
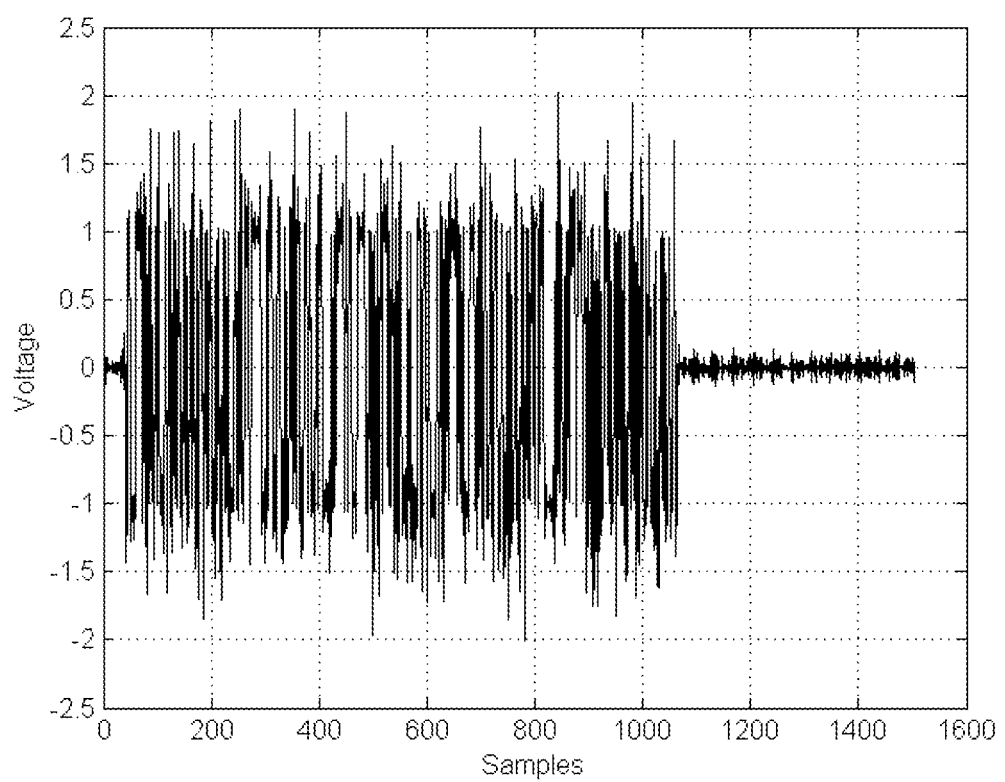

After the digital filter is configured, the received signal, or at least the data portion of the received signal, is processed by that filter and filtered so as to mitigate distortion induced by the channel as indicated by step 86. FIG. 8 is an exemplary illustration of the data portion of the receive signal 60 of FIG. 5 after being filtered by a digital filter configured on the basis or as a function of the channel distortion characteristics derived from the preamble portion of the signal (e.g., per steps 82 and 84). As is evident from the "zeros" leading and trailing the data portion of the signal illustrated in FIG. 8 (i.e., the portions of the signal with no substantial output level), the digital filter introduces an unknown variable delay into the signal. This delay is the result of the uncertainty in where the first preamble actually is in the received signal. The amount of the leading and trailing zeros may vary, and the data portion of the filtered signal may wrap around on itself based on factors such as the delays in the preamble detection and filtering.

Figure 9:
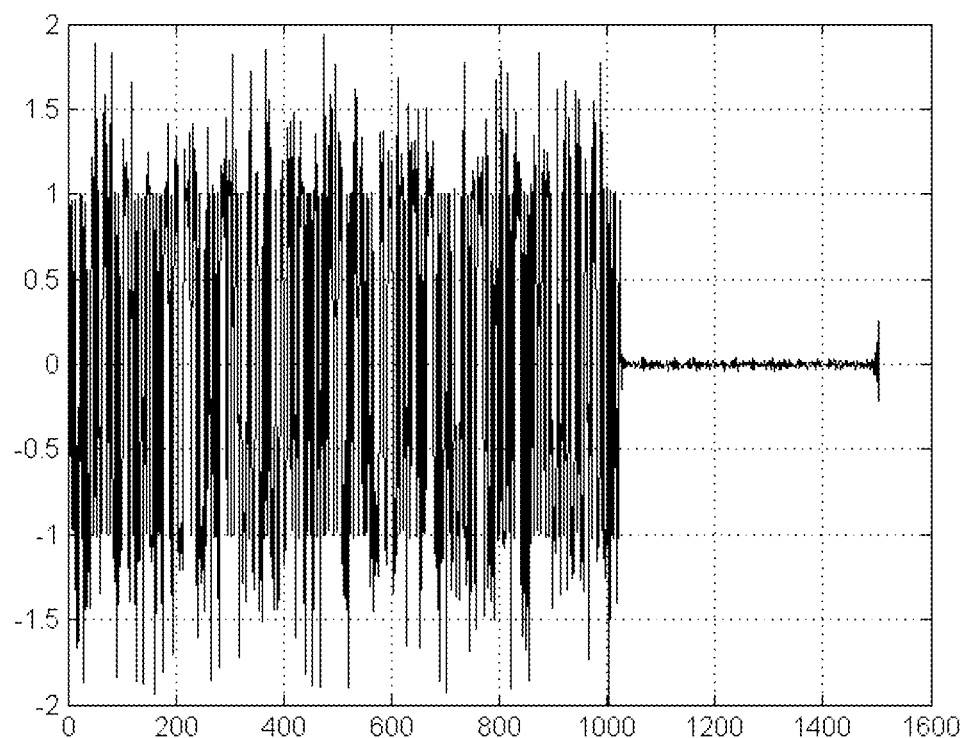

Timing accuracy is enhanced by correlating the second preamble of the received signal, as indicated at step 88. Using the output of the second preamble correlation, processor 36 can estimate to a relatively high degree of accuracy the remaining delay error in the filtered received signal as shown by step 90. By way of example, the algorithm used by processor 36 to perform the second preamble correlation may be a combination of a peak detection of the correlator output and conventional symbol timing recovery such as zero crossing detection. Using the error estimation generated by step 90, processor 36 can identify the samples of the receive signal that correspond to the beginning of that signal. In particular, the processor 36 can accurately identify the beginning of the data portions of the signal as shown by step 92. FIG. 9 is an exemplary illustration of a filtered receive signal after it has been time synchronized in accordance with embodiments of the method described above. Steps 88, 90 and 92 thereby provide a second and relatively fine time synchronization.

Although the invention has been described with reference to preferred embodiments, those of skill in the art will recognize that changes can be made in form and detail without departing from the spirit and scope of the invention. By way of non-limiting examples, techniques described herein may be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be embodied by radio technology such as universal terrestrial radio access (UTRA) or CDMA2000. TDMA may be embodied by radio technology such as global system for mobile communications (GSM)/general packet radio service (GPRS)/enhanced data rates for GSM evolution (EDGE). OFDMA may be embodied by radio technology such as IEEE 802.11 (Wi-Fi), IEEE 802.16 (WiMAX), IEEE 802-20, evolved UTRA (E-UTRA), etc.

The invention claimed is:

1. A method for operating a receiver in a wireless communication system to synchronize the receiver to a received signal, comprising:
   receiving a signal defining a downlink frame portion including a plurality of slots, including a broadcast control channel (BCCH) slot including information used to control parameters of an associated uplink frame portion, wherein the parameters include one or more of transmission time, slot time and length, frequency or modulation method, and wherein one or more of the slots includes a first preamble, a second preamble that is at a location after the first preamble and separated from the first preamble by a guard interval, and a data portion, wherein the second preamble precedes the data portion; and
   digitally processing the received signal, including:
      frequency shifting the downlink frame portion of the received signal from an intermediate frequency to base band;
      demodulating the downlink frame portion first preamble correlating the one or more of the slots of the received signal to identify the first preamble;
   processing the one or more of the slots of the received signal, including at least a portion of the identified first preamble, to determine signal-distorting channel delay spread characteristics of the channel over which the one or more of the slots of the received signal propagated;
   configuring a digital filter based on the determined channel delay spread characteristics to compensate for the signal-distorting channel characteristics;
   filtering the one or more of the slots of the received signal with the configured digital filter;
   second preamble correlating the filtered one or more of the slots of the received signal to identify the second preamble and to produce a second preamble correlation;
   processing the filtered one or more of the slots of the received signal using the second preamble correlation to identify remaining delay error in the filtered one or more of the slots of the received signal; and
   identifying and processing the data portions of the filtered one or more of the slots of the received signal based on the identified remaining delay error.

2. The method of claim 1 wherein the received signal has communication frames.

3. The method of claim 1 wherein the received signal has a single carrier frequency.

4. The method of claim 1 wherein one or more of the steps of first preamble correlating, processing to determine the channel delay spread characteristics, configuring the digital filter, filtering the received signal and second preamble correlating are done on digital samples of the received signal.

5. The method of claim 1 wherein processing the one or more of the slots of the received signal to determine signal-distorting channel delay spread characteristics includes processing the one or more of the slots of the received signal from a location preceding the identified first preamble through a location following the identified first preamble.

6. The method of claim 1 wherein identifying and processing the data portions of the filtered one or more of the slots of the received signal based on the identified remaining delay error includes identifying samples of the received signal.

7. The method of claim 1 wherein second preamble correlating includes correlating the second preamble at a beginning of the data portion of the one or more of the slots of the signal.

8. The method of claim 7 wherein second preamble correlating includes correlating the second preamble that is shorter than the first preamble.

9. The method of claim 1 and further including operating a transmitter to produce a transmit signal defining the uplink frame portion including a plurality of slots; comprising:
   inserting a first preamble into one or more of the slots of the transmit signal; and
   inserting a second preamble in one or more of the slots of the transmit signal, wherein each second preamble is inserted into the one or more of the slots at a location that is after the first preamble and separated from the first preamble by a guard interval; and
   transmitting the transmit signal having the first and second preambles.

10. The method of claim 9 wherein inserting the second preamble includes inserting a second preamble that is shorter than the first preamble.

11. The method of claim 10 wherein inserting the second preamble includes inserting the second preamble at a location adjacent to the data portion.

12. The method of claim 11 wherein inserting the second preamble includes inserting the second preamble at a location preceding the data portion of the signal.

13. A transceiver comprising:
a receiver providing a received signal defining a downlink frame portion including a plurality of slots, including a broadcast control channel (BCCH) slot including information used to control parameters of an associated uplink frame portion, wherein the parameters include one or more of transmission time, slot time and length, frequency or modulation method, and wherein one or more of the slots includes a first preamble, a second preamble that is at a location after the first preamble and separated from the first preamble by a guard interval, and a data portion, wherein the second preamble precedes the data portion; and
a digital processor configured to:
frequency shift the downlink frame portion of the received signal from an intermediate frequency to base band;
demodulate the downlink frame portion;
first preamble correlate the one or more slots of the received signal to identify the first preamble;
process the one or more slots of the received signal, including at least a portion of the identified first preamble, to determine signal-distorting channel delay spread characteristics of the channel over which the one or more slots of the received signal propagated;
configure a digital filter based on the determined channel delay spread characteristics to compensate for the signal-distorting channel characteristics;
filter the one or more slots of the received signal with the configured digital filter;
second preamble correlate the filtered one or more slots of the received signal to identify the second preamble and to produce a second preamble correlation;
process the filtered one or more slots of the received signal using the second preamble correlation to identify remaining delay error in the filtered one or more slots of the received signal; and
identify and process the data portions of the filtered one or more slots of the received signal based on the identified remaining delay error.

14. A transceiver comprising:
a receiver providing a received signal defining a downlink frame portion including a plurality of slots, including a broadcast control channel (BCCH) slot including information used to control parameters of an associated uplink frame portion, wherein the parameters include one or more of transmission time, slot time and length, frequency and/or modulation method, and wherein one or more of the slots includes a first preamble, a second preamble that is at a location after the first preamble and separated from the first preamble by a guard interface, and a data portion, wherein the second preamble precedes the data portion;
a transmitter to transmit a transmit signal defining the uplink frame portion including a plurality of slots; and
a digital processor configured to:
frequency shift the downlink frame portion of the received signal from an intermediate frequency to base band;
demodulate the downlink frame portion;
first preamble correlate the one or more slots of the received signal to identify the first preamble;
process the one or more slots of the received signal, including at least a portion of the identified first preamble, to determine signal-distorting channel delay spread characteristics of the channel over which the one or more slots of the received signal propagated;
configure a digital filter based on the determined channel delay spread characteristics to compensate for the signal-distorting channel characteristics;
filter the one or more slots of the received signal with the configured digital filter;
second preamble correlate the filtered one or more slots of the received signal to identify the second preamble and to produce a second preamble correlation;
process the filtered one or more slots of the received signal using the second preamble correlation to identify remaining delay error in the filtered one or more slots of the received signal;
identify and process the data portions of the filtered one or more slots of the received signal based on the identified remaining delay error;
insert a first preamble into the one or more slots of the transmit signal;
insert a second preamble in the one or more slots of the transmit signal, wherein the second preamble is inserted into the one or more slots of the transmit signal at a location that is after the first preamble and separated from the first preamble by a guard interval; and
transmit the transmit signal having the first and second preambles.

* * * * *